US00RE43167E

(19) United States
(12) Reissued Patent
Horvath

(10) Patent Number: US RE43,167 E
(45) Date of Reissued Patent: Feb. 7, 2012

(54) EXERCISE DEVICE

(76) Inventor: Juliu Horvath, Miami Beach, FL (US)

(21) Appl. No.: 12/813,194

(22) Filed: Jun. 10, 2010

Related U.S. Patent Documents

Reissue of:
(64) Patent No.: 7,384,384
Issued: Jun. 10, 2008
Appl. No.: 10/900,749
Filed: Jul. 28, 2004

U.S. Applications:
(60) Provisional application No. 60/566,854, filed on Apr. 30, 2004.

(51) Int. Cl.
*A63B 26/00* (2006.01)

(52) U.S. Cl. ..... 482/142; 482/41

(58) Field of Classification Search ..... 482/142, 482/91–93, 51, 41–43, 62–63, 70–72; D21/662, D21/665, 686, 690
See application file for complete search history.

(56) References Cited

U.S. PATENT DOCUMENTS 4,529,194 A * 7/1985 Haaheim ..... 482/70
4,679,786 A * 7/1987 Rodgers ..... 482/70
4,804,178 A * 2/1989 Friedebach ..... 482/70
4,826,158 A * 5/1989 Fields, Jr. ..... 482/142
4,948,121 A * 8/1990 Haaheim et al. ..... 482/70
5,224,909 A * 7/1993 Hamilton ..... 482/70
5,328,427 A * 7/1994 Sleamaker ..... 482/71
5,342,266 A * 8/1994 Dailey ..... 482/71
7,014,602 B2 * 3/2006 Yamauchi ..... 482/142
2004/0023760 A1 * 2/2004 Cockrill et al. ..... 482/93
2004/0053752 A1 * 3/2004 Yang ..... 482/70
2004/0142800 A1 * 7/2004 Gerschefske ..... 482/142
2004/0176223 A1 * 9/2004 Morris et al. ..... 482/93
2004/0176227 A1 * 9/2004 Endelman ..... 482/142
2006/0189454 A1 * 8/2006 Bull ..... 482/71

* cited by examiner

*Primary Examiner* — Lori Baker
(74) *Attorney, Agent, or Firm* — Ostrolenk Faber LLP

(57) ABSTRACT

An exercise apparatus including two parallel, longitudinally extending hand rails, a longitudinally extending base unit, legs that connect the hand rails to the base unit, the base unit including a rail assembly and a rail support frame, and four roller pads mounted on the rail assembly so as to be individually movable along the rails.

30 Claims, 6 Drawing Sheets

EXERCISE DEVICE

Matter enclosed in heavy brackets [ ] appears in the original patent but forms no part of this reissue specification; matter printed in italics indicates the additions made by reissue.

PRIORITY CLAIM

This application claims priority to U.S. Provisional Application Ser. No. 60/566,854, filed Apr. 30, 2004.

BACKGROUND OF THE INVENTION

Exercise devices of many types are known. Examples of such devices or exercise systems are those sold under the Universal® and Nautilus® trademarks.

The Universal® machine system provides a single machine which is essentially an aggregation of several separate exercise devices, each part only performing one exercise operation on a single part of the body.

Such prior art systems have the disadvantage that the user is required to move physically from station to station to exercise the entire body.

SUMMARY OF THE INVENTION

It is an object of the present invention to provide an exercise apparatus which allows multiple exercises to be carried out on a single device and which permits stretching, extension and mobility exercises to be carried out, as well as resistance training.

Pursuant to this object, and others which will become apparent hereafter, one aspect of the present invention resides in an exercise apparatus having two parallel longitudinally extending handrails that are horizontal to the ground. A longitudinally extending base unit rests on the ground and legs connect the hand rails to the base unit. The base unit includes a rail assembly and a rail support frame. Four roller pads are mounted on the rail assembly so as to be individually movable along the rails.

In another embodiment of the invention, the rail assembly includes two pairs of the rails. Each of the rails has a C-shaped cross-section and the rails of each pair are arranged so that the C-shaped sections face one another.

In still another embodiment, the rail assembly is pivotally mounted at one end to a first end of the rail support frame so that the rail assembly can be pivoted between a horizontal position and an angled position. A support member is pivotally mounted to a second end of the rail support so that the support member can be pivoted between a stowed position and a use position in which the support member supports the rail assembly in the angled position.

Yet another embodiment of the invention provides a backboard pivotally mounted to the base unit at a first end of the rail support frame so as to be pivotal between a first, horizontal position in which the backboard rests against the top of the base unit, and a second, vertical position in which the backboard is parallel to the legs at one end of the exercise apparatus.

In still another embodiment, each of the roller pads has a main body dimensioned to fit between a pair of the rails, an upper platform is mounted on the main body so as to be above the rails when the main body is between the rails. The upper platform has a width that is greater than a distance between the rails of a pair of rails. Each roller pad further has wheels arranged on each side thereof so as to ride along a lower flange of the rails.

A further embodiment of the invention provides guide wheels at the front and/or back ends of the main body of each roller pad. The guide wheels are rotatable about a vertical axis and are arranged to be in engagement with the back wall of the C-shaped rails.

A resistance mechanism can be provided for each of the roller pads so that each of the roller pads is subjected to independent resistance during movement along the rails.

In yet another embodiment of the invention, the platform of each roller pad has mounting holes. A carriage having projections that are insertable in the mounting holes can be mounted to the roller pads. The carriage has a bench member pivotally mounted thereon so that the bench member can be pivoted between a position in which it rests completely against the carriage and a position in which the bench is at an angle to the carriage. The bench also has a support member mounted on a bottom side of the bench for supporting the bench in the angled position.

The backboard can also be provided with holes for mounting additional exercise components. Such exercise components can include a circular rotatable seat.

The base unit can also be provided with a centrally located vertical hole into which add-on components can be mounted. Such add-on components can include a propeller member that is rotatable about a central axis for the rotatable seat member. The propeller member, in another embodiment, can have a plurality of evenly-spaced holes in its surface. These holes also serve for mounting additional components such as a crescent-shaped or round rotatable member. To use the add-on components, one either stands, sits or places one's hands thereon.

Other features and advantages of the present invention will become apparent from the following description of the invention which refers to the accompanying drawings.

DETAILED DESCRIPTION OF THE INVENTION

Figure 1:
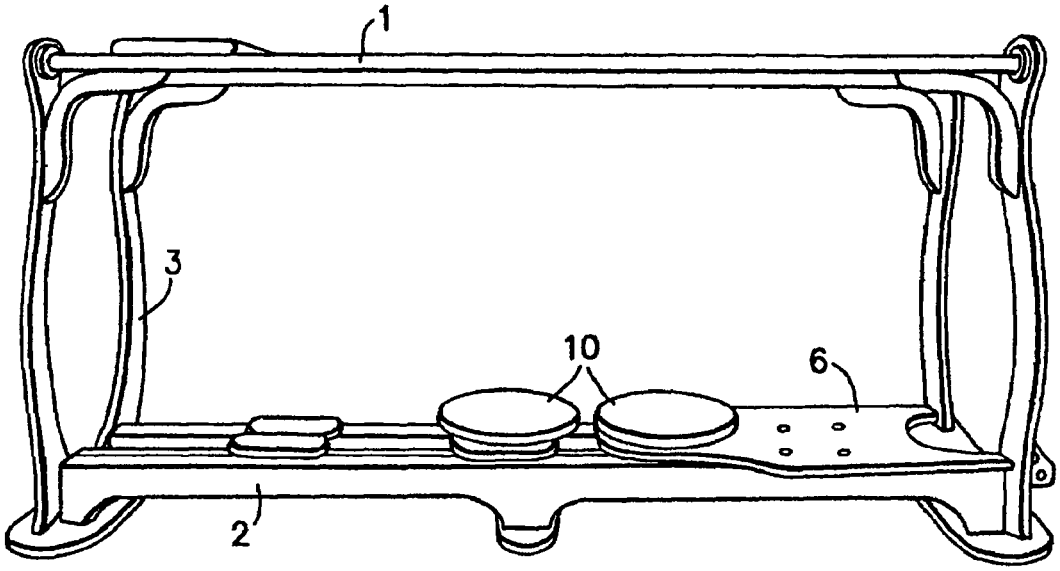
FIG. 1 is a side view of one embodiment of the inventive device.

Referring to the drawings, as can be seen in FIG. 1, the device has a frame with two parallel hand rails 1, a base unit 2, and legs 3 arranged at the ends of the hand rails 1 and base unit 2 for connecting the hand rails 1 to the base unit 2 so that hand rails 1 are at a distance from the base unit 2 sufficient to permit a person standing on the base unit 2 to hold the hand rails for 1 support.

Figure 2:
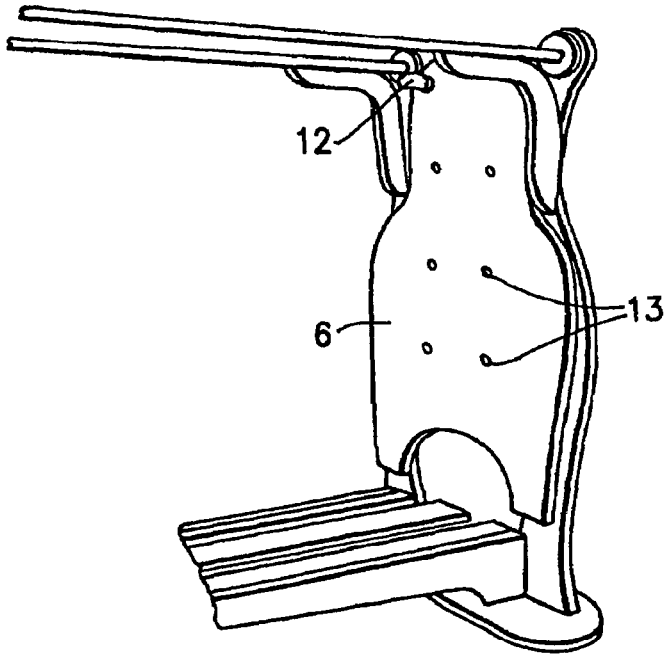
FIG. 2 is a view showing the backrest in a vertical position.

A backboard 6 is pivotally mounted to the legs 3 at one end of the base unit 2. The backboard 6 pivots between a first, horizontal position as shown in FIG. 1 and a second, vertical position as shown in FIG. 2. The backboard 6 is held in the second, vertical position by at least one blocking member 12 that is rotatably attached to one of the legs and can be pivoted to hold the backboard 6 in the vertical position and can also be pivoted away from the backboard to permit movement to the horizontal position. It is to be understood that other types of locking mechanisms are possible and would be evident to those skilled in the art. The illustrated and described blocking member is only one possible construction for a device which could accomplish the same purpose. For example, other suitable devices would be a strap which is attached to the backboard and wraps around a portion of the leg to hold the backboard in place, or a magnetic connection wherein a magnet is provided either on the backboard or one of the legs and a metal plate is provided on the other of the backboard and the legs so that when the backboard is in the vertical position the magnet and the metal plate make contact and hold the backboard in position.

Figure 3:
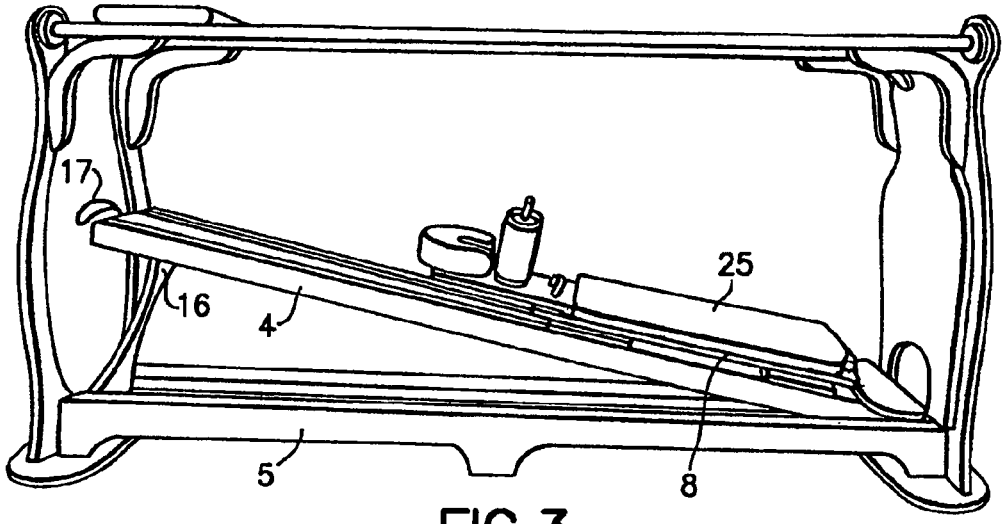
FIG. 3 is a view as in FIG. 1 showing another operative position of the apparatus.
Figure 4:
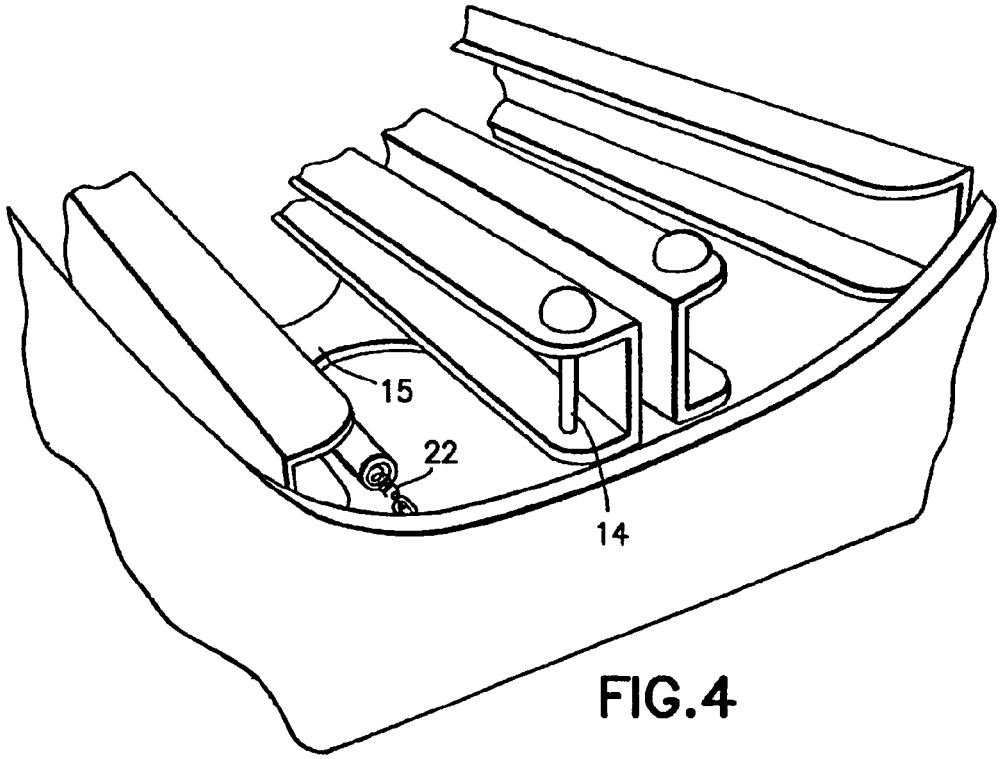
FIG. 4 is an end view of the rail structure.

The base unit 2 has four longitudinally extending, parallel rails 4. Each rail is a C-channel and the rails are arranged in pairs so that the channels of two rails face one another to form two parallel tracks, as shown in FIG. 4. The tracks are held in parallel alignment by cross members 15. The cross members 15 also serve to hold the rails together as a single construction. This construction of rails is pivotally attached at one end to the rail support frame 5 of the base unit 2. The rail support frame 5 is configured so that when the rails 4 are in a horizontal position the upper surface of the rails is substantially level with the upper surface of the rail support frame. In order to hold the rails 4 in an angled position, a support member 16 is provided, as shown in FIG. 3. The support member 16 is pivotally attached at one end to the rail support frame 5 so that the support member can be pivoted into an upper position in which the rails rest on the support member, again as shown in FIG. 3. The support member 16 also pivots down to a horizontal position in which the support member 16 is beneath the rails 4 when in the position shown in FIG. 1.

A strap or handle 17 is provided at the end of the rail construction to assist in pivoting the rails up out of the rail support frame 5.

Figure 5:
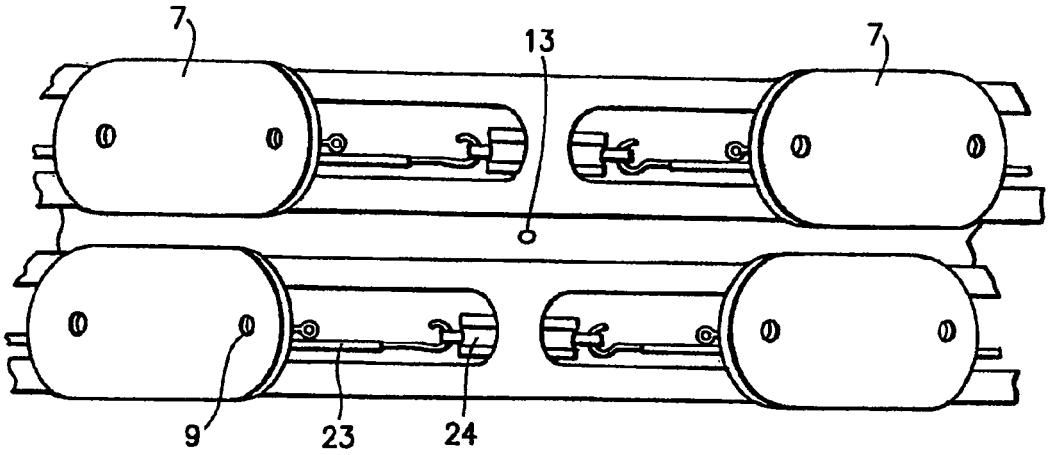
FIG. 5 is a top view of the base.
Figure 6A:
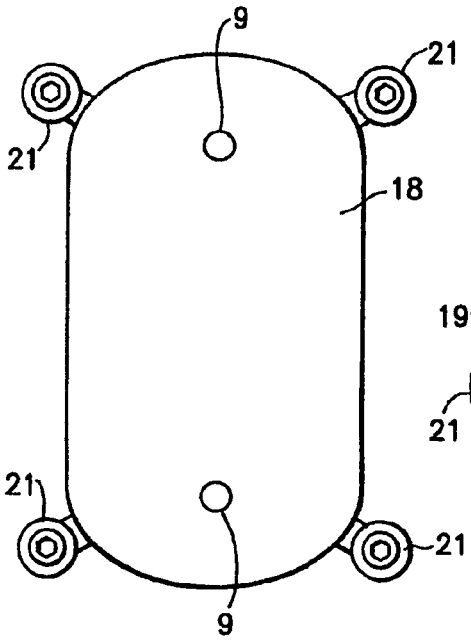
FIG. 6 is a perspective view of a roller pad.
Figure 6B:
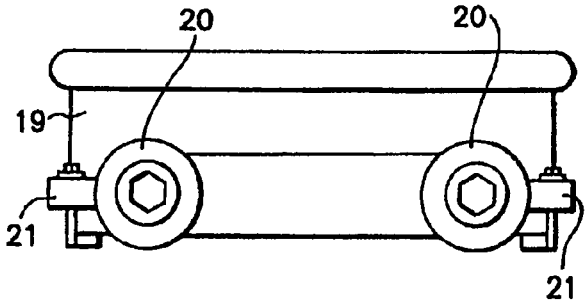

As shown in FIG. 5, four independent roller pads 7 are provided with two of the roller pads being arranged in each pair of rails 4. The roller pads 7 are independently movable along the rails 4. Each roller pad 7, as shown in FIG. 6, has an upper platform 18 that is wider than the gap between the pair of rails, and a main body portion 19 that fits between the rails. This is visible in FIG. 4. Each roller pad 7 has four wheels 20. Two of the wheels 20 are arranged on each side of the main body 19 and rotate about horizontal axes. The wheels run along the side flanges of the C-channels which form the rails 4. The roller pad 7 can also be provided with guide wheels 21 arranged on the front and/or the back of the main body 19. The guide wheels are rotatable about a vertical axis, as shown in FIG. 6. The guide wheels 21 ride against the back wall of the C-channels which form the rails, for the purpose of stabilizing linear movement of the roller pad 7 along the rails 4.

A separate resistance inducing device is provided for each of the roller pads 7 so that independent resistance is provided to each of the pads. The resistance can be provided, for example, by a spring or an elastic member. In FIGS. 4 and 5, the resistance is provided by a spring 22 that is attached to the rail support frame 5 at one end of a pair of rails. A cable 23 is connected at one end to the spring 22, then passes 180° over a pulley 24 at the center of the base and then is connected at the other end to one of the roller pads 7. In this way, when the roller pad is moved along the rail, the spring 22 provides resistance to the movement. Other types of mechanisms for providing resistance are known to those in the art and could easily be substituted for the spring construction described. Additionally, by disconnecting the cable 23 from the roller pad 7, the roller pad 7 can be used without resistance.

Figure 7:
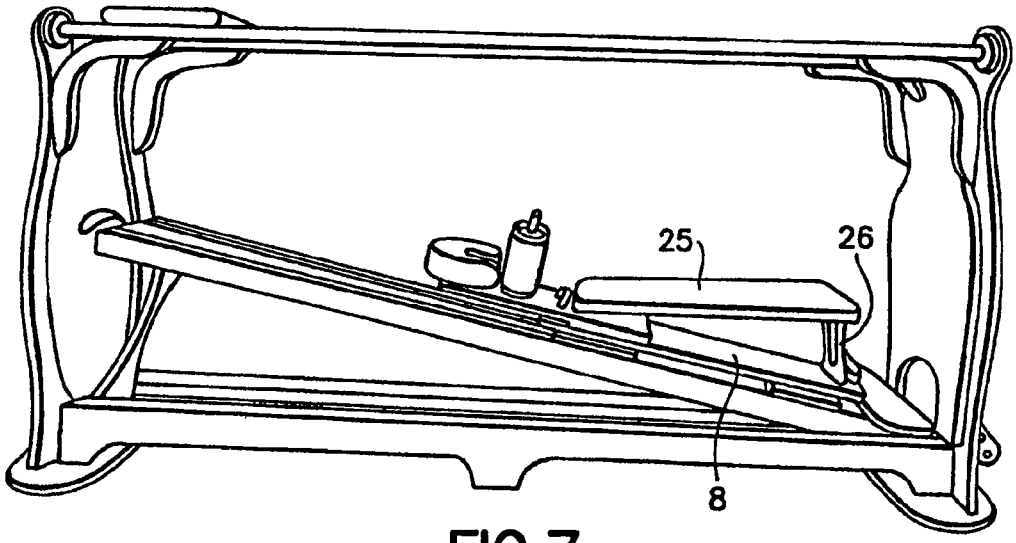
FIG. 7 is a view showing the bench at an angled position.

Each of the roller pads is provided with at least one hole 9 in the upper platform 18. A carriage 8 is mountable in the holes in the roller pad 7, for example, by pins or other projecting shapes. The carriage 8 has a bench 25 that is pivotally mounted at one end to the carriage 8 so that the other end of the bench 25 can be raised and lowered. A support member 26 is pivotally mounted to the bottom of the bench 25 so that when the bench 25 is pivoted from the carriage 8, the support member 26 can drop down to hold the bench 25 at an angle to the carriage 8. This is shown in FIG. 7.

Figure 8:
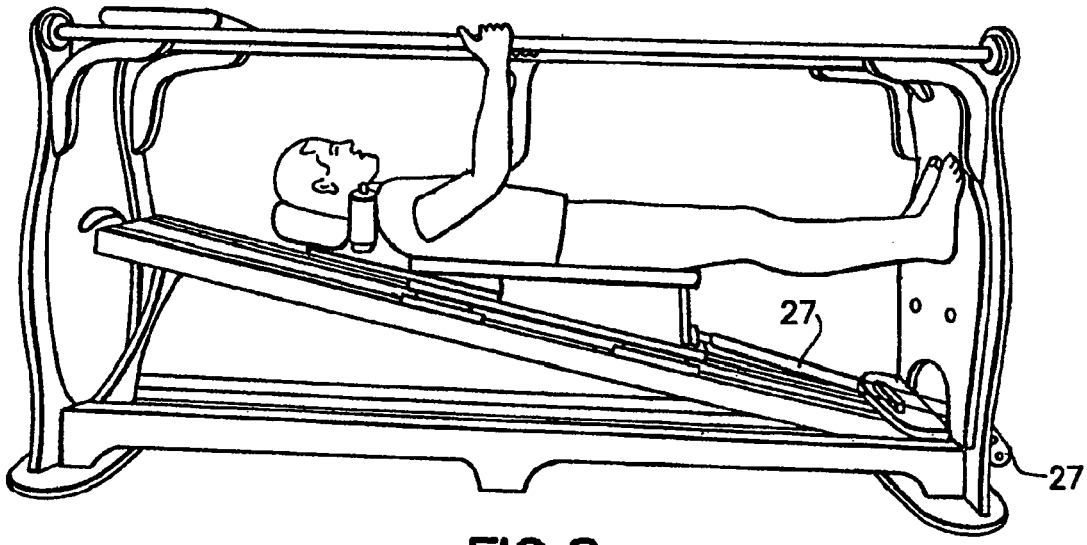
FIG. 8 is a view as in FIG. 7 showing a tensioning device.

FIG. 8 shows an additional tension mechanism 27 that is attachable to an end of the carriage for providing resistance to movement of the carriage. This tension mechanism 27 can be either an elastic member or a spring member, for example. Other constructions of resistance devices are within the knowledge of those skilled in the art.

Holes 13 are provided in the backboard 6 for the mounting and use of additional components. Similar holes are also provided in the carriage 8, and a hole 13, as shown in FIG. 5, is provided in the center of the base unit 2. This hole 13 extends vertically through the base unit 2 when the rails are arranged flat in the rail support frame 5.

Figure 9:
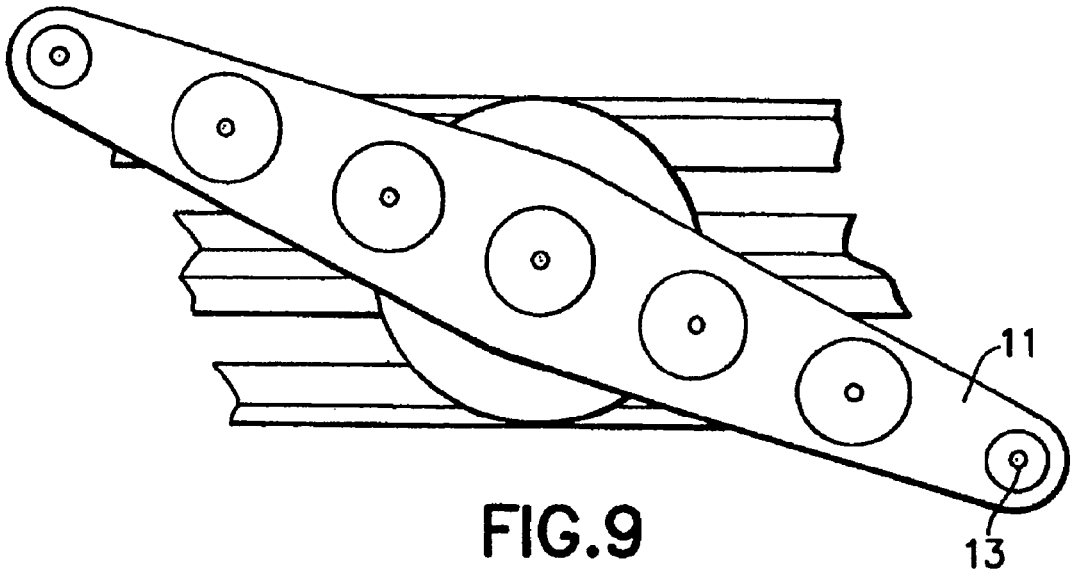
FIG. 9 is a view showing a propeller add-on component.
Figure 10:
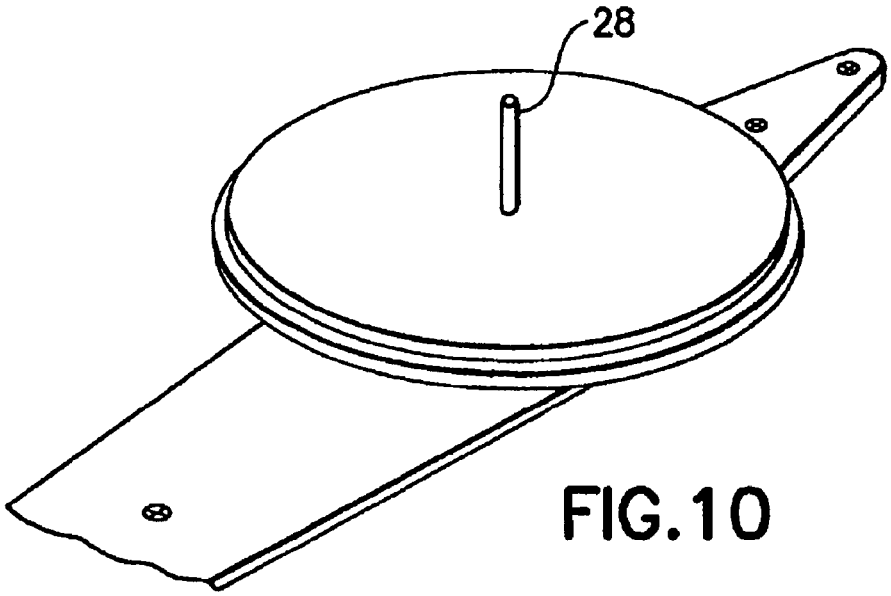
FIG. 10 is a bottom view of the propeller component.
Figure 11:
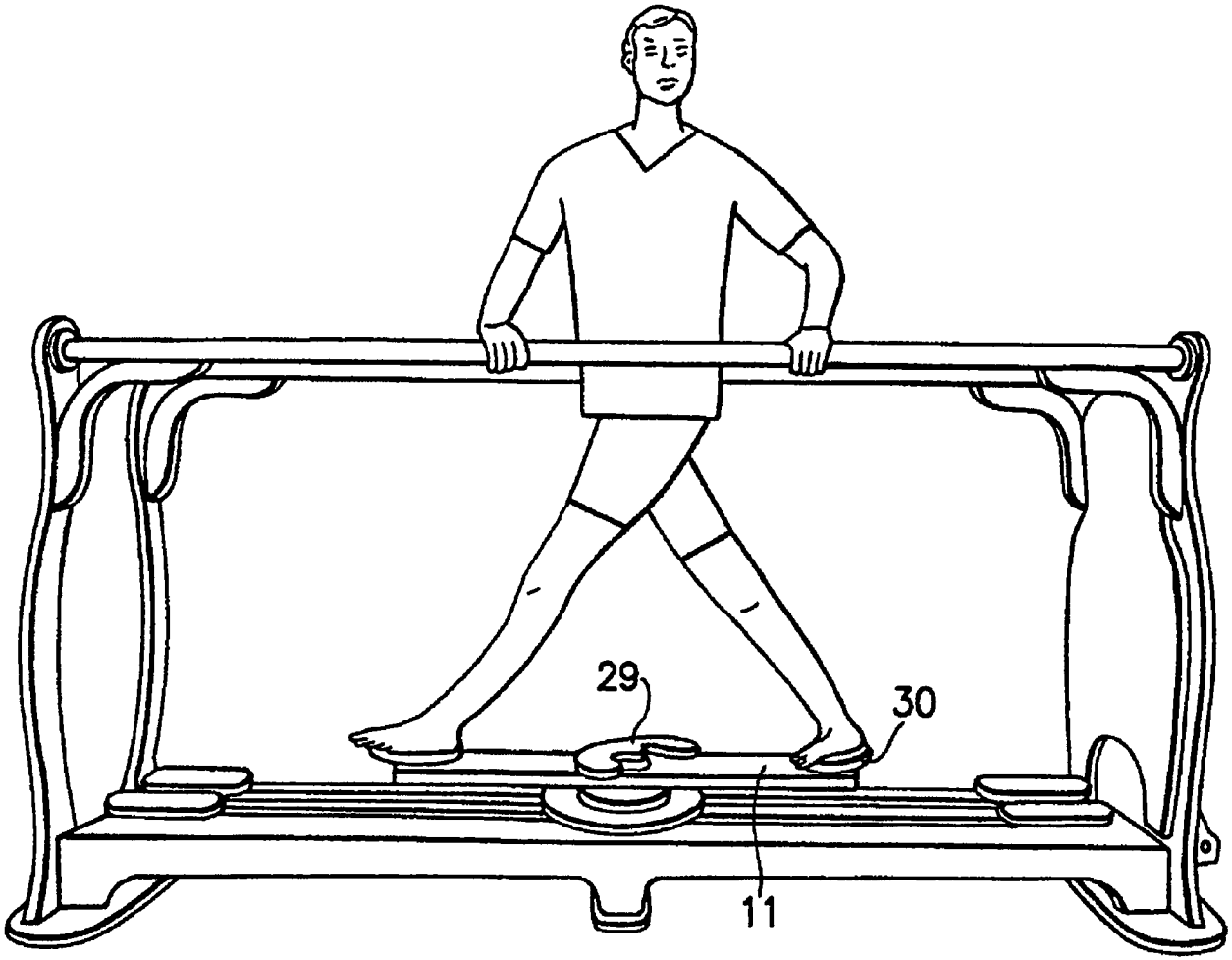
FIG. 11 shows the propeller component mounted on the exercise apparatus.

One of the additional components is a propeller 11 shown in FIGS. 9-11. The propeller 11 has a downwardly extending pin 28 that is insertable in the central hole 13 in the base unit 2. The propeller 11 is rotatable through 360°. The propeller can also be inserted via the pin 28 into any one of the holes in any of the other components of the inventive exercise device.

FIG. 1 shows rotatable seats 10 that have pins that are insertable in the holes of the roller pads 7 or the backboard 6. As with the propeller mechanism 11, the seats 10 can be mounted in any desired holes to provide varying types of physical movement possibilities. A crescent-shaped support member 29 is illustrated in FIG. 11, as are circular support pads 30. These pads 29, 30 also have pins that are mountable in the various holes of the various components so as to provide differing exercise possibilities.

At the non-hinged end of the rail assembly, at least two of the rails are provided with stops 14 that prevent the roller pads 7 from leaving the rails 4 when the rail assembly is in the angled position.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An exercise apparatus, comprising:

two parallel, longitudinally extending hand rails;

a longitudinally extending base unit;

legs that connect the hand rails to the base unit, the base unit including a rail assembly and a rail support frame; and roller pads mounted on the rail assembly so as to be individually movable along the rails;

wherein the rail assembly includes pairs of rails, each of the rails having a cross-section, the rails of each pair being arranged so that the cross-sections face one another;

wherein the rail assembly is pivotally mounted at one end to a first end of the rail support frame so that the rail assembly can be pivoted between a horizontal position and an angled position.

2. An exercise apparatus as in claim 1, and further comprising a support member pivotally mounted to a second end of the rail support frame so that the support member can be pivoted between a stowed position and a use position in which the support member supports the rail assembly in the angled position.

3. An exercise apparatus as in claim 1, and further comprising a backboard pivotally mounted to the base unit at the first end of the rail support frame so as to be pivotable between a first, horizontal position wherein the backboard rests against a top of the base unit, and a second, vertical position in which the backboard is parallel to the legs at one end of the exercise apparatus.

4. An exercise apparatus according to claim 3, further comprising a blocking mechanism for holding the backboard in the vertical position.

5. An exercise apparatus according to claim 1, wherein each of the roller pads has a main body dimensioned to fit between a pair of rails, an upper platform mounted to the main body so as to be above the rails, the upper platform having a width that is greater than a distance between the rails of one of the pairs of rails, each roller pad further having wheels arranged on each side thereof so as to rotate about a horizontal axis and ride along a lower flange of the rails.

6. An exercise apparatus according to claim 5, wherein four wheels are provided on the roller pads, two on each side of the main body.

7. An exercise apparatus, comprising:

[two parallel, longitudinally extending hand rails;]

a longitudinally extending base unit[; legs that connect the hand rails to the base unit], the base unit including a rail assembly and a rail support frame; and roller pads mounted on the rail assembly so as to be individually movable along the rails;

wherein the rail assembly includes pairs of rails, each of the rails having a cross-section, the rails of each pair being arranged so that the cross-sections face one another;

wherein each of the roller pads has a main body dimensioned to fit between a pair of rails, an upper platform mounted to the main body so as to be above the rails, the upper platform having a width that is greater than a distance between the rails of one of the pairs of rails, each roller pad further having wheels arranged on each side thereof so as to rotate about a horizontal axis and ride along a lower flange of the rails;

and further comprising guide wheels provided at a front end and/or at a back end of the main body of each roller pad, the guide wheels being rotatable about a vertical axis and being arranged to be in engagement with a back wall of the rails.

8. An exercise apparatus according to claim 5, and further comprising a resistance mechanism provided for each of the roller pads whereby each roller pad is subjected to independent resistance during movement along the rails.

9. An exercise apparatus according to claim 8, wherein the resistance apparatus includes a tension spring mounted to the rail support frame at one end, a pulley mounted substantially midway along a length of the rails, and a cable having one end connected to the tension spring, and another end attached to one of the roller pads, an intermediate portion of the cable being looped over the pulley up to an angle of 180°.

10. An exercise apparatus according to claim 1, wherein at least one rail of each pair of rails has a stop member with an end opposite the end mounted to the rail support spring, the stop member being arranged to prevent the roller pads from leaving the channel when the rail assembly is in the angled position.

11. An exercise apparatus, comprising:

[two parallel, longitudinally extending hand rails;]

a longitudinally extending base unit[; legs that connect the hand rails to the base unit], the base unit including a rail assembly and a rail support frame; and roller pads mounted on the rail assembly so as to be individually movable along the rails, wherein the platform of each roller pad has at least one mounting hole therein, and further comprising a carriage having projections that are insertable in the holes in the roller pads so as to mount the carriage to the roller pads, the carriage having a bench member pivotally mounted thereon at one end so that the bench member can be pivoted between a position in which it rests completely against the carriage, and a position in which the bench is at an angle to the carriage.

12. An exercise apparatus according to claim 11, wherein the bench has a support member mounted to a bottom side of the bench at an end opposite the end pivotally mounted to the carriage, the support member being pivotable between a stowed position substantially parallel to the bench and a use position in which the support member supports the bench in the angled position relative to the carriage.

13. An exercise apparatus according to claim 11, further comprising a tensioning mechanism attached to one end of the carriage for providing resistance to movement of the carriage.

14. An exercise apparatus, comprising:

two parallel, longitudinally extending hand rails;

a longitudinally extending base unit;

legs that connect the hand rails to the base unit, the base unit including a rail assembly and a rail support frame; and roller pads mounted on the rail assembly so as to be individually movable along the rails, further comprising a backboard pivotally mounted to the base unit at the first end of the rail support frame so as to be pivotable between a first, horizontal position wherein the backboard rests against the base unit, and a second, vertical position in which the backboard is at one end of the exercise apparatus, wherein the backboard has a plurality of holes therein and the upper platform of each of the roller pads has holes therein, and further comprising add-on exercise components that are mountable in the holes.

15. An exercise apparatus according to claim 14, wherein the add-on exercise components include a circular rotatable seat member that has pins that correspond to the holes so that the seat member is mountable in the holes.

16. An exercise apparatus according to claim 15, wherein the base unit has a substantially centrally located vertical hole relative to the length of the base unit, the add-on components including a propeller member that is rotatable about a central axis, the propeller member having a pin coaxial with the center axis, which pin is insertable in the central hole in the base unit.

17. An exercise apparatus according to claim 16, wherein the propeller member has an upper surface with a plurality of evenly spaced holes in which additional components are mountable.

18. An exercise apparatus according to claim 17, wherein the additional include a crescent-shaped member that is rotatable about a pin that is insertable in an opening in the propeller member.

19. An exercise apparatus according to claim 11, wherein the rail assembly includes two pairs of rails, each of the rails having a C-shaped cross-section, the rails of each pair being arranged so that the C-shaped sections face one another.

20. An exercise apparatus according to claim 11, wherein the rail assembly is pivotally mounted at one end to a first end of the rail support frame so that the rail assembly can be pivoted between a horizontal position and an angled position.

21. An exercise apparatus according to claim 14, wherein the rail assembly includes two pairs of rails, each of the rails having a C-shaped cross-section, the rails of each pair being arranged so that the C-shaped sections face one another.

22. An exercise apparatus according to claim 14, wherein the rail assembly is pivotally mounted at one end to a first end of the rail support frame so that the rail assembly can be pivoted between a horizontal position and an angled position.

23. An exercise apparatus according to claim 14, further comprising a blocking mechanism for holding the backboard in the vertical position.

24. An exercise apparatus as in claim 1, wherein said assembly includes two rails, each of said rails having two of said roller pads mounted thereon.

25. An exercise apparatus as in claim 24, wherein each of said roller pads is independently movable along the length of the corresponding rail.

26. An exercise apparatus as in claim 25, and further comprising a resistance mechanism provided for each of the roller pads whereby each roller pad is subjected to independent resistance during movement along the corresponding rail.

27. An exercise apparatus, comprising:

[two parallel, longitudinally extending hand rails;]

a longitudinally extending base unit[; legs that connect the hand rails to the base unit], the base unit including a rail assembly and a rail support frame; and roller pads mounted on the rail assembly so as to be individually movable along the rails;

further comprising a seat rotatably mountable on at least one of said roller pads.

28. An exercise apparatus as in claim 1, further comprising a seat rotatably mountable on said backboard.

*29. An exercise apparatus, comprising: a longitudinally extending base unit, the base unit including a rail assembly and a rail support frame; and roller pads mounted on the rail assembly so as to be individually movable along the rails; wherein the rail assembly includes pairs of rails, each of the rails having a cross-section, the rails of each pair being arranged so that the cross-sections face one another; wherein the rail assembly is pivotally mounted at one end to a first end of the rail support frame so that the rail assembly can be pivoted between a horizontal position and an angled position.*

*30. An exercise apparatus, comprising: a longitudinally extending base unit, the base unit including a rail assembly and a rail support frame; and roller pads mounted on the rail assembly so as to be individually movable along the rails, further comprising a backboard pivotally mounted to the base unit at the first end of the rail support frame so as to be pivotable between a first, horizontal position wherein the backboard rests against the base unit, and a second, vertical position in which the backboard is at one end of the exercise apparatus, wherein the backboard has a plurality of holes therein and the upper platform of each of the roller pads has holes therein, and further comprising add-on exercise components that are mountable in the holes.*

* * * * *